(12) United States Patent
Udipi et al.

(10) Patent No.: US 11,560,144 B2
(45) Date of Patent: Jan. 24, 2023

(54) DRIVE SAFETY FORECAST FOR FUTURE DRIVES

(71) Applicant: Microsoft Technology Licensing, LLC, Redmond, WA (US)

(72) Inventors: Rahul Anantha Padmanabha Udipi, Cupertino, CA (US); Christopher Yu, San Francisco, CA (US); Maxon Reave Wheeler, Los Gatos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 116 days.

(21) Appl. No.: 16/860,576

(22) Filed: Apr. 28, 2020

(65) Prior Publication Data

US 2021/0331668 A1    Oct. 28, 2021

(51) Int. Cl.
*B60W 30/08* (2012.01)
*G01C 21/34* (2006.01)
*G08G 1/01* (2006.01)

(52) U.S. Cl.
CPC ......... *B60W 30/08* (2013.01); *G01C 21/3492* (2013.01); *G08G 1/0129* (2013.01); *G08G 1/0133* (2013.01); *G08G 1/0145* (2013.01)

(58) Field of Classification Search
CPC . B60W 30/08; G01C 21/3492; G08G 1/0129; G08G 1/0133; G08G 1/0145
See application file for complete search history.

(56) References Cited

U.S. PATENT DOCUMENTS

| | | | | |
|---|---|---|---|---|
| 9,927,252 | B1 * | 3/2018 | Chokshi | G01C 21/3461 |
| 9,947,052 | B1 * | 4/2018 | Slusar | G08G 1/096775 |
| 10,036,644 | B2 * | 7/2018 | Chokshi | G01C 21/3461 |
| 10,096,038 | B2 * | 10/2018 | Ramirez | G01C 21/3461 |
| 10,101,164 | B2 * | 10/2018 | Thakur | G01C 21/3697 |
| 10,157,422 | B2 * | 12/2018 | Jordan Peters | G06Q 30/0207 |
| 10,209,085 | B2 * | 2/2019 | Chokshi | G01C 21/3461 |

(Continued)

FOREIGN PATENT DOCUMENTS

| | | |
|---|---|---|
| CN | 202475487 U | 10/2012 |
| CN | 104539304 A | 4/2015 |
| CN | 205353941 U | 6/2016 |

OTHER PUBLICATIONS

"Non Final Office Action Issued in U.S. Appl. No. 16/860,474", dated Jun. 4, 2021, 23 Pages.

(Continued)

*Primary Examiner* — Luis A Martinez Borrero

(57) ABSTRACT

In non-limiting examples of the present disclosure, systems, methods and devices for surfacing drive safety notifications are provided. A personal driving pattern library comprising first data associated with a first user for a plurality of road sections included in a first route may be maintained. A global driving pattern library comprising second data associated with a plurality of users for the plurality of road sections included in the first route may be maintained. A determination may be made that the first user is going to travel the first route. A first drive safety score for the first user driving the first route may be calculated. A determination may be made that the first drive safety score is below a threshold value. A drive safety notification may be caused to be surfaced.

20 Claims, 12 Drawing Sheets

(56) References Cited

U.S. PATENT DOCUMENTS

| | | | |
|---|---|---|---|
| 10,395,526 B1* | 8/2019 | Slusar | G08G 1/0116 |
| 10,460,600 B2* | 10/2019 | Julian | G08G 1/0129 |
| 10,563,994 B2* | 2/2020 | Chokshi | G01C 21/3461 |
| 11,037,247 B2* | 6/2021 | Bogovich | G08G 1/096827 |
| 11,062,341 B2* | 7/2021 | Ramirez | G06Q 10/0635 |
| 11,118,923 B2* | 9/2021 | Chintakindi | G06F 16/29 |
| 11,150,100 B2* | 10/2021 | Chokshi | G01C 21/3461 |
| 2011/0213628 A1* | 9/2011 | Peak | G06Q 40/08 705/4 |
| 2011/0282627 A1* | 11/2011 | Jang | G08G 1/0112 702/179 |
| 2012/0123806 A1* | 5/2012 | Schumann, Jr. | G06Q 40/08 705/4 |
| 2014/0074873 A1 | 3/2014 | Ngo et al. | |
| 2016/0086285 A1* | 3/2016 | Jordan Peters | G08G 1/096827 701/484 |
| 2016/0109251 A1* | 4/2016 | Thakur | G01C 21/3697 705/335 |
| 2016/0171521 A1* | 6/2016 | Ramirez | B60K 35/00 701/409 |
| 2017/0083821 A1 | 3/2017 | Foerster et al. | |
| 2017/0191847 A1* | 7/2017 | Chintakindi | G06F 3/04842 |
| 2018/0164112 A1* | 6/2018 | Chintakindi | G06F 3/04842 |
| 2018/0180430 A1* | 6/2018 | Chokshi | G01C 21/3461 |
| 2018/0219759 A1 | 8/2018 | Brown et al. | |
| 2018/0252543 A1* | 9/2018 | Chokshi | G01C 21/3461 |
| 2018/0374113 A1* | 12/2018 | Ramirez | G08G 1/096838 |
| 2019/0028288 A1 | 1/2019 | Keil et al. | |
| 2019/0066223 A1* | 2/2019 | Bogovich | H04W 4/024 |
| 2019/0101914 A1* | 4/2019 | Coleman, II | G08G 1/0112 |
| 2019/0163973 A1 | 5/2019 | Keohane et al. | |
| 2019/0170525 A1* | 6/2019 | Chokshi | G01C 21/3461 |
| 2019/0301877 A1* | 10/2019 | Duale | G01C 21/3484 |
| 2020/0173799 A1* | 6/2020 | Chokshi | G01C 21/3461 |
| 2021/0337352 A1 | 10/2021 | Udipi et al. | |

OTHER PUBLICATIONS

"International Search Report & Written Opinion issued in PCT Application No. PCT/US21/020972", dated May 19, 2021, 13 Pages.

"International Search Report & Written Opinion issued in PCT Application No. PCT/US21/022448", dated Jun. 1, 2021, 11 Pages.

* cited by examiner

DRIVE SAFETY FORECAST FOR FUTURE DRIVES

BACKGROUND

Driving and automotive safety are significant problems which cause many deaths and significant property damage. While safety features in automobiles have improved substantially in recent times, one of the primary causes of traffic accidents is the inexperience or impairment of the driver of the automobile. While new safety features provide improved sensing and alerts, they are not well tailored to the experience and ability of a particular driver under particular conditions. Nor are there satisfactory systems which provide customized drive safety monitoring and notifications that are customized based on the characteristics of a particular group, such as a family group.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for surfacing drive safety notifications. A group device monitoring service may be associated with a plurality of user accounts and a plurality of computing devices. One or more of the user accounts may be administrator accounts and one or more of the user accounts may be secondary user accounts. Users associated with the group device monitoring service may opt in to allowing the group device monitoring service to collect locational, temporal, and/or drive safety information from one or more of their computing devices. The data that may be collected may include historical drive patterns, such as times, days of the week, and dates that users drive specific routes. The data may also include, speed data, braking data, acceleration data, steering data (e.g., aggressive maneuvering), and/or device use while driving data. The group device monitoring service may make predictions, based on the historical drive pattern data, regarding when a user is going to drive a route. The group device monitoring service may calculate a drive safety score for that route based on historical drive safety data for the user and based on historical drive safety data from one or more other users. If the drive safety score falls below a threshold value, the group device monitoring service may cause a drive safety notification to be surfaced on one or more computing devices associated with the user's group. The drive safety notifications may include warnings to administrator users and/or secondary users about route and time combinations where the user has had a particularly bad pattern of driving safety issues. In additional examples, the drive safety notifications may include recommendations to take alternative routes, and/or recommendations to leave at alternative times. In examples where a drive safety notification is surfaced on an administrator user's computing device, the notification may include a selectable element to send automatic drive safe recommendations to a device associated with a secondary user that is driving the predicted route.

BRIEF DESCRIPTION OF THE DRAWINGS

Non-limiting and non-exhaustive examples are described with reference to the following figures.

DETAILED DESCRIPTION

Figure 1:
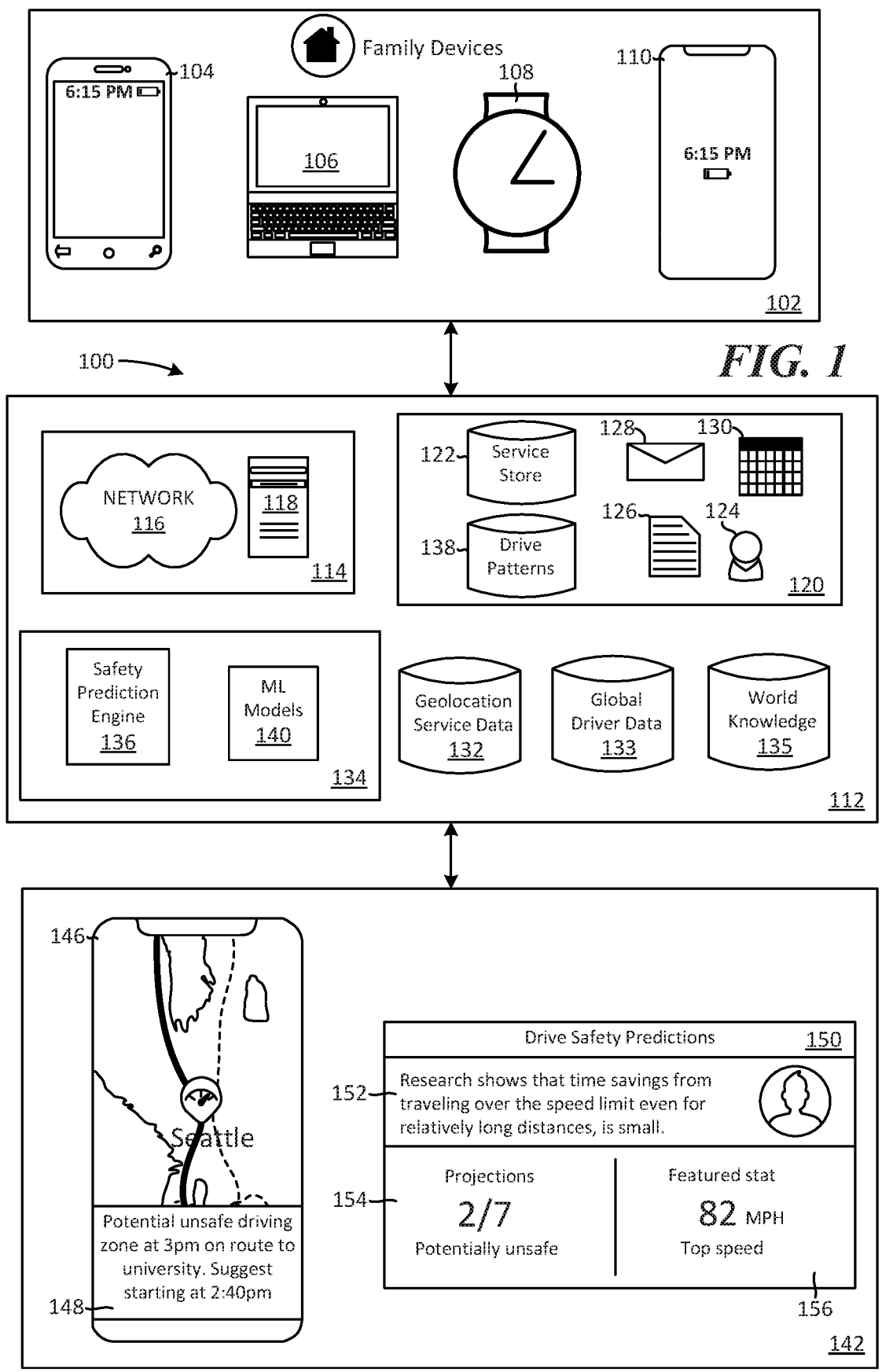
FIG. 1 is a schematic diagram illustrating an example distributed computing environment for generating and surfacing drive safety forecasts in relation to a group device monitoring service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for surfacing drive safety notifications. A group device monitoring service may associate a plurality of user accounts and computing devices with one another. For example, a first user account may create a group with the group device monitoring service. The group may comprise a plurality of user accounts and a plurality of computing devices. The first user account may be designated by the group device monitoring service as an administrator user account. The administrator user account may have administrative controls and permissions in relation one or more secondary user accounts for the group. The administrative controls and permissions may relate to device usage, application usage, and/or device location. In some examples, the administrator user account may designate one or more user accounts of the group as co-administrator accounts that also have administrative controls and permissions in relation to one or more secondary user accounts for the group.

The group device monitoring service may collect locational information and/or drive safety information related to user accounts that it monitors that have opted in to data collection by the service. The group device monitoring service may provide locational information about computing devices associated with one or more other user accounts of a group to an administrator user account of the group. In some examples, the administrator user account may allow secondary user accounts to receive locational information about administrator computing devices.

The group device monitoring service may collect drive safety information from users, including speed data, braking data, acceleration data, steering data (e.g., aggressive maneuvering), and/or device usage data. The group device monitoring service may tag that information with locational and/or temporal tags. In some examples, the group device monitoring service may identify drive patterns associated with accounts that it monitors. For example, if a user is determined to drive from a first location to a second location on a first route a threshold number of times and/or with a threshold frequency, that route and/or time may be tagged as a pattern. The group device monitoring service may thus make predictions regarding future drives based on these tagged patterns. In examples, the group device monitoring service may calculate drive safety scores for predicted drives, and cause drive safety notifications to be surfaced to one or more devices associated with a monitored group. The drive safety scores may be based on personal drive factors. The personal drive factors may have been collected directly from computing devices associated with a user that the upcoming drive is predicted for. Those personal drive factors may include speed data, braking data, acceleration data, steering data (e.g., aggressive maneuvering), and/or device usage data. The drive safety scores may additionally or alternatively be based on global driver factors (e.g., factors collected from a plurality of other drivers). The global driver factors may also include speed data, braking data, acceleration data, steering data (e.g., aggressive maneuvering), and/or device usage data.

The drive safety notifications may be surfaced on a computing device associated with the user that is predicted to make the corresponding drive. In additional examples, the drive safety notifications may be surfaced on a computing device associated with an administrator of a group that includes a secondary user that is predicted to make the corresponding drive. In still additional examples, the drive safety notifications may be surfaced on one or more computing devices associated with administrator users and one or more computing devices associated with secondary users. The drive safety notifications may include warnings to administrator users and/or secondary users about route and time combinations where the user has had a particularly bad pattern of driving safety issues. The drive safety notifications may additionally or alternatively include recommendations to take alternate routes, recommendations to leave at alternate times, and/or selectable elements for causing drive safety recommendations to be provided (e.g., play audio recommendation to watch speed via computing device connected to car audio, surface text recommendation to watch for upcoming traffic on computing device connected to car display device) to the user that is determined to make a predicted drive.

The systems, methods, and devices described herein provide technical advantages for predicting future drives and providing safety recommendations. Processing costs associated with determining what the traffic and/or drive safety statistics may be at a future drive time are reduced in that a user does not have to manually input potential drive times and routes into a map/traffic application. Rather, only if a predicted driving route is identified as likely being unsafe (e.g., a safety score is determined to be below a threshold value), does a second calculation for a secondary time for traveling that route and/or a different route need to be calculated. The need to perform those calculations and the calculations themselves may be completely automated by the group device monitoring service. The user experience associated with tracking other group users and getting in touch with them is also enhanced. For example, rather than an administrator user having to ask (e.g., via text, by making a phone call) a secondary user what time the secondary user is going to embark on a certain drive, the group device monitoring service can make that prediction automatically based on historical driver patterns and alert the administrator user. Additionally, the group device monitoring service may prompt an administrator user if a secondary user is going to be driving in a potentially unsafe driving area and/or at a potentially unsafe driving time, and the administrator user can cause safety notifications and/or safety recommendations to be automatically sent to the secondary user. In some examples, the group device monitoring service may prompt and/or warn an administrator user if a secondary user is predicted to take a route for which the secondary user has a personal driving history that is particularly bad (e.g., drive safety score based on personal drive factors that falls below a threshold value).

FIG. 1 is a schematic diagram illustrating an example distributed computing environment 100 for generating and surfacing drive safety forecasts in relation to a group device monitoring service. Computing environment 100 includes family devices sub-environment 102, group monitoring service sub-environment 112, and drive safety notification sub-environment 142.

Family devices sub-environment 102 includes tablet computing device 104, laptop computing device 106, smartwatch computing device 108, and smartphone computing device 110. In this example, each of the devices illustrated in family devices sub-environment 102 belong to members of a family and are associated with a group device monitoring service via a family account. However, it should be understood that computing devices may be associated with the group device monitoring service via a generic group account and devices need not necessarily be associated with family members.

Group monitoring service sub-environment 112 includes network and processing sub-environment 114, service store sub-environment 120, geolocation service data store 132, global driver data store 133, world knowledge data store 135, and group device monitoring elements 134. Network and processing sub-environment 114 includes network 116, via which any and all of the computing devices described herein may communicate with one another, and server computing device 118. Server computing device 118 is illustrative of one or more server computing devices that may host a group device monitoring service.

The group device monitoring service may be associated with a group. The group may include a plurality of user accounts, and each of the plurality of user accounts may be associated with one or more computing devices. The group may include one or more administrator accounts and one or more secondary accounts. In some examples, the administrator accounts may be associated with parent users of a family group, and the secondary accounts may be associated with child users of a family group.

In examples, one or more user accounts of a group may be associated with a drive pattern list of the group device monitoring service. A drive pattern list for a user may include information (e.g., geolocation coordinates, type classification) about locations that the user drives to and from; and times, dates, and/or days of the week that the user takes certain routes. A drive pattern list may be associated with one or more computing devices of a user account that the drive pattern relates to. For example, if a drive pattern list relates to a first user account, that drive pattern list may include identifying information (IP addresses, device IDs) for one or more computing devices associated with the first user account.

Service store sub-environment 120 may include information associated with the group device monitoring service and/or one or more productivity application services. For example, service store sub-environment may include one or more location pattern lists, such as in drive patterns store 138, one or more group identities and settings for a group monitored by the group device monitoring service, and/or content associated with one or more additional applications. Some or all of this information may be saved in service store 122. In some examples, service store 122 may be associated with a plurality of user accounts, such as user account 124. User account 124 may be associated with a group monitored by the group device monitoring service. User account 124 may additionally or alternatively be associated with one or more productivity application services. In this example, user account 124 is associated with an email application service, a word processing application service, and a calendar application service. As such, service store 122 includes email messages 128 associated with user account 124, documents 126 associated with user account 124, and calendar information 130 associated with user account 124. Service store 122 may include additional information from one or more other applications, such as SMS messaging applications, group messaging/collaboration applications, task management applications, to-do list applications, map applications, reservation applications, presentation applications, and spreadsheet applications, for example.

Drive patterns store 138 may include drive information that is specific to the user associated with user account 124. For example, drive patterns store 138 may include not only a drive pattern list for user account 124, but it may also include drive safety information for one or more routes included in that list. For example, drive pattern store 138 may include historical drive data for one or more drives that the user associated with user account 124 may have taken on routes included on a drive pattern list. The historical drive data may include speed data, braking data, acceleration data, steering data (e.g., aggressive maneuvering), and device usage data. The speed data may be associated with location data and speed limit data for the location data. The speed data may also be associated with temporal data (e.g., what time did the speed at the location take place). The braking data may be associated with location data and temporal data. The acceleration data may be associated with locational data and temporal data. The steering data may be associated with locational data and temporal data. The device usage data may include a number of times that one or more devices associated with user account 124 (e.g., tablet computing device 104, laptop computing device 106, smartwatch computing device 108, and smartphone computing device 110) were active and/or interacted with during the driving of a route. In some examples, the device usage data may be associated with temporal data and locational data. Route data included in a drive pattern list may include the identity, type and/or location of roads that are taken on a route. In some cases, the roads may be automatically divided into sections (e.g., by mile markers, by some other distance metric), and the historical drive data may be associated with individual road sections.

Geolocation service data store 132 may include geolocation data associated with one or more parameters. For example, geolocation service data store 132 may include a list of geocoordinates, entities that are present at those geocoordinates, types of those entities, hours of operation for those entities, IP addresses associated with geocoordinates, boundaries and/or geofences for specific areas included in the geocoordinates, and/or crime data for areas. In some examples, when a computing device associated with a group is active, the group device monitoring service may determine geolocation coordinates for a location where a computing device is currently active. Those coordinates may be provided to geolocation service data store 132, which may match the coordinates to one or more locations, entities, location types, and/or crime data. The geocoordinates for an active device may be identified via cellular data, GPS data, and/or WiFi data, for example.

Global driver data store 133 may include drive information for a plurality of users. In some examples, the global drive data included in global driver data store 133 may be collected from one or more user accounts associated with the group device monitoring service. For example, only those accounts for which users have manually opted into providing their data to the group device monitoring elements may have their route and/or drive data collected by the group device monitoring service. Global driver data store 133 may include drive safety information from one or more routes and/or road sections. For example, global driver data store 133 may include historical and/or current drive data for one or more drives that the users that have opted into data collection may have taken or are currently taking. The historical and/or current drive data may include speed data, braking data, acceleration data, steering data (e.g., aggressive maneuvering), and device usage data. The speed data may be associated with location data and speed limit data for the location data. The speed data may also be associated with temporal data (e.g., what time did the speed at the location take place). The braking data may be associated with location data and temporal data. The acceleration data may be associated with locational data and temporal data. The steering data may be associated with locational data and temporal data. The device usage data may include a number of times that one or more devices associated with a user account of a user that has opted into data collection were active and/or interacted with during the driving of a route. In some examples, the device usage data may be associated with temporal data and locational data. The data included in global driver data store 133 may be associated with individual road sections to which the data corresponds.

World knowledge store 135 may include information obtained from the world wide web. For example, world knowledge store 135 may include saved and/or dynamic content from the world wide web. World knowledge store 135 may be searchable by the group device monitoring service. World knowledge store 135 may include road information, speed limit information, road construction information, and event information. Event information may include information about historical and/or upcoming events that may affect driving safety and/or driving conditions. For example, event information may include dates, times and locations of major events (e.g., sporting events, concerts) that may impact driving conditions. Event information may include weather data and/or holiday data. In some examples, world knowledge store 135 may include historical driving data for roads that are proximate to (e.g., half mile radius, one mile radius, ten mile radius) one or more events. For example, world knowledge store 135 may include driving data associated with one or more users, that have opted into data collection, for roads or road sections proximate to sporting events at times when the sporting events started or ended.

Group device monitoring elements 134 include safety prediction engine 136 and machine learning models 140. Safety prediction engine 136 may perform one or more operations associated with identifying that a user is going to drive from a first location to a second location at a specific time and identifying a time that the user is going to start and end that drive. Safety prediction engine 136 may additionally perform one or more operations associated with analyzing historical and/or current driving data (e.g., speed data, braking data, acceleration data, steering data, device use data) and determining whether an identified route that is likely to be taken from the first location to the second location is likely to be safe or unsafe. In additional examples, safety prediction engine 136 may perform one or more operations associated with identifying one or more alternative routes that are safer than a predicted route for a user.

Machine learning models 140 may include one or more machine learning models that have been trained to identify one or more words or sentences (e.g., from calendar events, emails, SMS messages) that are relevant to a "drive" intent. That is, machine learning models 140 may analyze data from service store sub-environment 120 (e.g., emails, documents, text messages, calendar events, etc.) and identify a likelihood that a user is planning on driving. In some examples, machine learning models 140 may identify a time associated with a potential drive, a start location associated with a potential drive, and/or an end location associated with a potential drive.

Machine learning models 140 may include one or more word and/or sentence embedding layers (e.g., Word2Vec, BERT, Sent2Vec, Embeddings from Language Models (ELMo), recurrent neural network). Machine learning models 140 may further include a sentence level information aggregation layer for aggregating embeddings from each word in a natural language input into a distinct embedding for one or more sentences included in a natural language input. The distinct sentence aggregation layer may apply a neural network to the embeddings for each word. In examples, the neural network may comprise a gated recurrent unit (GRU) neural network or bidirectional GRU (bi-GRU) neural network. In other examples the neural network may comprise a long short-term member (LSTM) neural network, an attention-based aggregation method, etc. Machine learning models 140 may further include a contextual aggregation layer for aggregating each distinct embedding for each of the sentences into a contextual embedding. In aggregating the distinct embeddings for each sentence, the contextual aggregation layer may apply a neural network to each distinct embedding for each of the sentences. In examples, the neural network may comprise a GRU neural network, or bi-GRU neural network. In other examples, the neural network may comprise an LSTM neural network, an attention-based aggregation method, etc. Machine learning models 140 may further comprise a scoring layer for scoring and ranking one or more sentences or one or more words based on their relevance to a drive intent. In scoring and ranking one or more words, the scoring layer may apply a classifier function to an embedding (e.g., embeddings generated by the contextual aggregation layer). In examples, the classifier function may comprise a sigmoid function. Other activation functions (e.g., tan h, softplus) may be utilized for scoring an embedding.

In this example, computing device 110 in family device sub-environment 102 is the same computing device as computing device 146 in drive safety notification sub-environment 142. Computing device 110 is associated with an administrator account of a group managed by the group device monitoring service. Computing device 104, computing device 106, and computing device 108 may be associated with secondary users of the group managed by the group device monitoring service. In this example, a secondary user of the group has been identified as being likely to drive a potentially unsafe route at 3 pm. For example, the group device monitoring service may make a determination that the secondary user is going to begin a drive from a first location to a second location (e.g., university) at approximately 3 pm. The group device monitoring service may make this determination based on analyzing historical drive data for the secondary user, and/or from data identified by machine learning models 140. Analyzing the historical drive data for the secondary user and determining that the secondary user is going to begin a drive from the first location to the second location may include identifying a pattern of the secondary user leaving the first location to the second location at approximately 3 pm (every day, on the current day of the week, periodically, etc.) a threshold number of times and/or with a threshold frequency. The group device monitoring service may additionally determine from the historical drive data that secondary user is likely to take a specific route from the first location to the second location. For example, the historical drive data for the secondary user may indicate that the secondary user has taken a specific route from the first location to the second location a threshold number of times and/or with a threshold frequency.

The group device monitoring service may make an additional determination that the specific route it has identified is likely to be an unsafe route (e.g., has a safety score that is below a threshold value), and/or one or more road sections included in the specific route have safety scores that are below a threshold value. This determination may be made based on analyzing historical drive data for the secondary user and historical drive data for one or more other drivers. The historical drive data for the secondary user may be included in drive patterns store 138. The historical drive data for the one or more other drivers may be included in global driver data store 133. The group device monitoring service may analyze historical speed data, historical braking data, historical acceleration data, historical steering data, and/or historical device usage data for one or more road sections included in the specific route for the secondary user and one or more additional users in making the determination that the specific route is likely unsafe at 3 pm. The data may be for the identified time that the user is likely to be at each road section included in the specific route. In some examples, the group device monitoring service may calculate an individual drive safety score for each road section included in a route. In additional examples, the group device monitoring service may calculate a drive safety score for an entire route by applying a function to each of the drive safety scores for the individual road sections. The drive safety scores may be calculated based on the application of one or more functions to the historical driving data. Additional details regarding the calculation of drive safety scores is provided below in relation to FIG. 2 and FIG. 3.

The group device monitoring service may identify one or more alternative times for taking the specific route that have acceptable drive safety scores (e.g., above a threshold value). In other examples, the group device monitoring service may identify one or more alternative routes for driving from the first location to the second location that have acceptable drive safety scores. The other safety scores that are calculated for the alternative routes may be for the same time that the secondary user was identified as leaving on the drive (e.g., 3 pm). In other examples, if the alternative routes are determined to take a longer time to drive than the original route, the group device monitoring service may recommend that the user leave earlier and calculate drive safety scores corresponding to the recommended time.

In this example, the group device monitoring service has identified that the specific route has an acceptable drive safety score at 2:40 pm. As such, the group device monitoring service causes drive safety notification 148 to be surfaced on computing device 146 (e.g., an administrator computing device). Drive safety notification 148 states: "Potential unsafe driving zone at 3 pm on route to university. Suggest starting at 2:40 pm". In some examples, the group device monitoring service may additionally or alternatively surface drive safety notifications, such as drive safety notification 148 on the secondary user's computing device (e.g., a computing device associated with the user that is going to drive the identified route).

Drive safety notification sub-environment 142 also includes drive safety predictions 150. Drive safety predictions 150 may include information related to a predicted drive. Drive safety predictions 150 include positive reinforcement element 152, projections 154, and featured statistic 156. Positive reinforcement element 152 includes text related to a negative safety factor that has been identified for the predicted drive and route. In this example, that safety factor is speeding. However, text related to other negative safety factors that are identified in upcoming drives and routes may be caused to be surfaced in drive safety predictions 150. In this example, positive reinforcement element 152 sates: "Research shows that time savings from traveling over the speed limit even for relatively long distances, is small."

Projections 154 may include a ratio of road sections out of a total number of road sections in an upcoming route that may have potentially unsafe characteristics associated with them (e.g., speeding, hard braking, fast acceleration, aggressive maneuvering, high device use). Featured statistic 156 may include a safety statistic related to an upcoming predicted route. The safety statistic may include a top speed from a previous drive of the route by the secondary user, a number of times that the secondary user accessed a computing device during a previous drive of the route, a number of times that the secondary user accelerated quickly during a previous drive of the route, and/or a number of times that the secondary user applied the brakes hard during a previous drive of the route.

Figure 2:
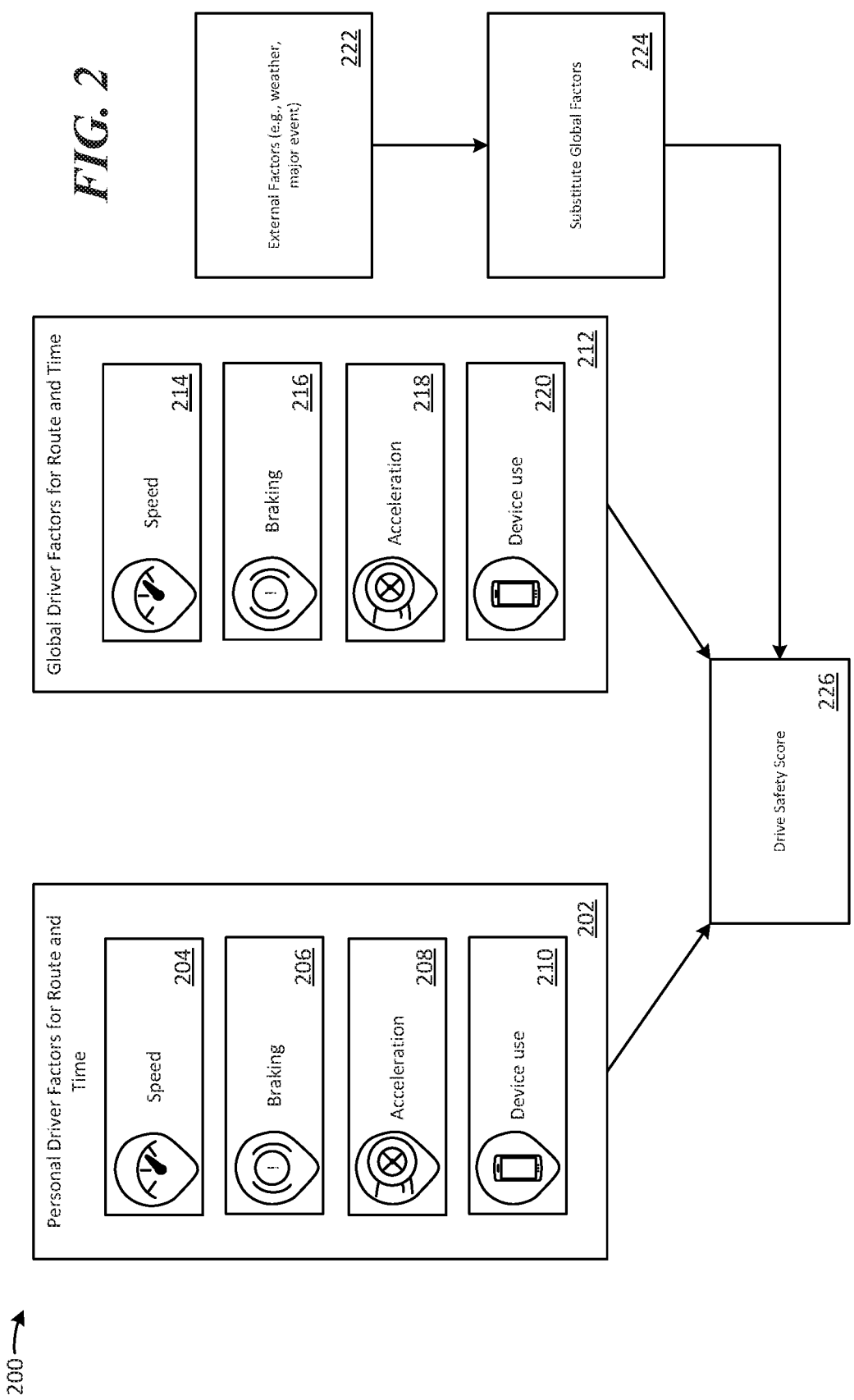
FIG. 2 illustrates a computing environment for processing specific personal and global drive data elements and calculating a drive safety score for a route.

FIG. 2 illustrates a computing environment 200 for processing specific personal and global drive data elements and calculating a drive safety score for a route. Computing environment 200 includes personal driver factors for route and time 202, global driver factors for route and time 212, external factors 222, substitute global factors 224, and drive safety score 226.

Personal driver factors for route and time 202 include a plurality of safety factors corresponding to historical drive data for a user associated with a group account that is monitored by the group device monitoring service. In some examples, the plurality of safety factors may relate to a secondary user account of a group account monitored by the group device monitoring service. In other examples, the plurality of safety factors may relate to an administrator user account of a group account monitored by the group device monitoring service. The plurality of safety factors may have been collected from a route (e.g., one or more road sections of a route) corresponding to a predicted route that a drive safety score is being calculated for. The plurality of safety factors may have been collected from the route at the time and/or day of the week corresponding to a predicted time and/or day of the week that the user is predicted to be on the predicted route (or on a road section for the predicted route). For example, if the group device monitoring service has made a determination that user A is predicted to start a route from location A to location B, and the predicted route includes road C and road D, the plurality of safety factors may have been collected from one or more computing devices associated with user A while driving on road C and road D. Additionally, if the group device monitoring service has made a determination that user A is predicted to be on road C from 3:00 to 3:15 pm and on road D from 3:15 to 3:30 pm on Tuesday, the plurality of safety factors may have been collected from one or more computing devices associated with user A while driving on road C and road D at approximately those times and/or on that day of the week.

Personal driver factors for route and time 202 include speed factor 204, braking factor 206, acceleration factor 208, and device use factor 210. In additional examples, personal driver factors for route and time 202 may include an aggressive maneuvering and/or steering factor. Personal driver factors for route and time 202 may include historical driving data from one or more previous trips on a route by a user. In some examples, the data for a route may be averaged or otherwise compiled for each factor if there is data for more than one historical trip on the route available for the user. Speed factor 204 may comprise a speed of the user (e.g., an identified speed based on geolocation of a computing device associated with the user account) on the route. In some examples, the speed may be compared against a speed limit for the corresponding road section, and a determination may be made as to whether and how much above the speed limit the user was traveling. Braking factor 206 may comprise a number of "hard brakes" on one or more road sections of a route. A hard brake may be classified as such based on a determination that a computing device associated with the user decelerated at a rate value X (e.g., X meters/second^2) over a threshold rate value Y (e.g., Y meters/second^2). Acceleration factor 208 may comprise a number of "hard accelerations" on one or more road sections of a route. Acceleration factor 208 may be classified as such based on a determination that a computing device associated with the user accelerated at a rate value X* (e.g., X*meters/second^2) over a threshold value Y* (e.g., Y* meters/second^2). Device use factor 210 may comprise a number of times and/or percentage of time that a computing device associated with the user was active and/or manually accessed while on one or more road sections of a route.

Global driver factors for route and time 212 include speed factor 214, braking factor 216, acceleration factor 218, and device user factor 220. In additional examples, global driver factors for route and time 212 may include an aggressive maneuvering and/or steering factor. Global driver factors for route and time 212 may include historical driving data from a plurality of trips taken on a route by a plurality of users. Those users may have opted in to having their data collected by the group device monitoring service. In some examples, the data for each factor on a route may be averaged or otherwise compiled for the global users. Speed factor 214 may comprise a speed of global users (e.g., an identified speed based on geolocation of computing devices associated with user accounts) on the route. In some examples, the speeds may be compared against a speed limit for the corresponding road section, and a determination may be made as to whether and how much above the speed limit the users were traveling. Braking factor 216 may comprise a number of "hard brakes" on one or more road sections of a route. A hard brake may be classified as such based on a determination that a computing device associated with a user decelerated at a rate value X (e.g., X meters/second^2) over a threshold rate value Y (e.g., Y meters/second^2). Acceleration factor 218 may comprise a number of "hard accelerations" on one or more road sections of a route. Acceleration factors 218 may be classified as such based on a determination that a computing device associated with a user accelerated at a rate value X* (e.g., X* meters/second^2) over a threshold value Y* (e.g., Y* meters/second^2). Device use factors 220 may comprise a number of times and/or percentage of time that a computing device associated with a user was active and/or manually accessed while on one or more road sections of a route.

Personal driver factors for route and time 202 and global driver factors for route and time 212 may be associated with timestamps. The timestamp data may be utilized to provide calculated drive safety scores for road sections and routes based on specific times that a user is predicted to be at those locations.

When the group device monitoring service determines that a user associated with a managed group is going to drive a specific route at a specific time, it may calculate a drive safety score (e.g., drive safety score 226) for that route and time. In doing so, values for one or more factors included in personal driver factors for route and time 202 for the specific route and time may be determined, and values for one or more factors included in global driver factors for route and time 212 for the specific route and time may be determined. Drive safety scores may be cached for faster retrieval at a later time. In some examples, the values for one or more factors included in personal driver factors for route and time 202 may only need to be determined for the specific route and need not necessarily be determined for the specific time. In additional examples, the values may be determined for each road section included in a route. One or more operations and/or functions may then be applied to the determined values from personal driver factors for route and time 202 and global driver factors for route and time 212, and drive safety score 226 may thus be calculated. A determination as to whether to surface a drive safety notification may be made based on drive safety score 226, as more fully discussed in relation to FIG. 7.

In some examples, external factors 222 that are not usual for a specific route and time may affect the integrity of drive safety score 226. Examples of external factors 222 include weather-related factors, major event factors, and holiday factors. For example, a specific route, or specific road sections on a route, may be particularly dangerous only in certain weather conditions (e.g., rain, snow). Similarly, a specific route, or specific road sections on a route, may be particularly dangerous (e.g., higher than normal braking, acceleration, device use) when major events, such as concerts and sporting events, are about to begin or have just ended. The group device monitoring service may query a world knowledge store (e.g., world knowledge store 135) and determine whether one or more road sections of a route are likely to be affected by external factors during a time that a monitored user account is predicted to be driving the route. If such factors are identified, substitute global factors 224 may replace global driver factors for route and time 212 in calculating drive safety score 226 for that specific route (or specific affected road section) and specific time. Substitute global factors 224 may include historical driver data for users on the specific road sections that were affected by the same or similar external factor types.

Figure 3:
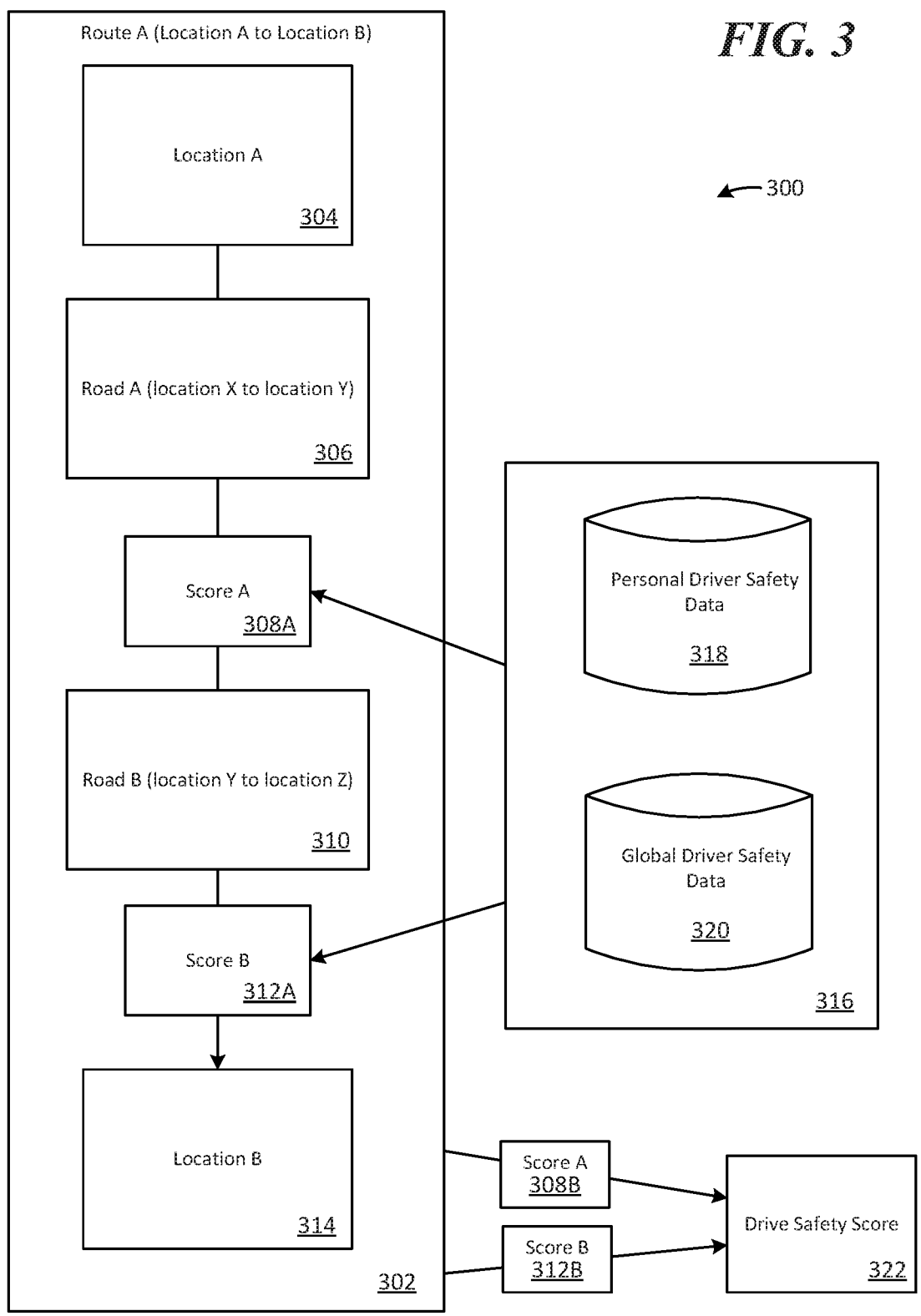
FIG. 3 illustrates a simplified block diagram for calculating a drive safety score from individual scores for a plurality of road sections included in a route.

FIG. 3 illustrates a simplified block diagram 300 for calculating a drive safety score from individual scores for a plurality of road sections included in a route. Block diagram 300 includes route A section scoring sub-environment 302, data store sub-environment 316, score A 308B, score B 312B, and drive safety score 322.

Route A section scoring sub-environment 302 includes location A 304, road A 306, score A 308A, road B 310, score B 312A, and location B 314. Location A 304 corresponds to a geolocation where the group device monitoring service has determined a user is going to begin a route. Location B 314 corresponds to a geolocation where the group device monitoring service has determined a user is going to end a route. Road A 306 corresponds to a first road section of the route (e.g., between location A 304 and location B 314). That is, the user is predicted to be on road A 306 from location X to location Y. Similarly, road B 310 corresponds to a second road section of the route (e.g., between location A 304 and location B 314). That is, the user is predicted to be on road B 310 from location Y to location Z.

The group device monitoring service may determine values for personal driver factors for road A 306. The driver data corresponding to those factors may be identified from personal driver safety data store 318, which may include historical driver data for the user that is predicted to travel the route from location A 304 to location B 314. In some examples, the data for the personal driver factors for road A 306 that the group device monitoring service identifies may correspond to a specific time, day of the week, or date that the group device monitoring service has predicted the user will be on road A 306. In other examples, the data for the personal driver factors for road A 306 that the group monitoring service identifies may correspond to any time, day of the week, or date the user drove road A 306.

The group device monitoring service may determine values for global driver factors for road A 306. The global driver data corresponding to those factors may be identified from global driver safety data store 320, which may include historical driver data for a plurality of drivers that have opted into data collection by the group device monitoring service. In some examples, the data for the global driver factors for road A 306 that the group device monitoring service identifies may correspond to a specific time, day of the week, or date that the group device monitoring service has predicted the user will be on road A 306. In other examples, the data for the global driver factors for road A 306 that the group monitoring service identifies may correspond to any times, days of the week, or dates the global users drove road A 306. In some examples, the global driver factors for road A 306 may be within a threshold temporal period (e.g., fifteen minutes, one hour) of the predicted time the user will be on road A 306.

The group device monitoring service may apply one or more operations and/or one or more functions to the determined values for personal driver factors for road A 306 and the determined values for global driver factors for road A 306, and thereby calculate score A 308A, which is a drive safety score for road A 306 (from location X to location Y) at a specific time that the user is predicted to be on road A 306.

The group device monitoring service may determine values for personal driver factors for road B 310. The driver data corresponding to those factors may be identified from personal driver safety data store 318, which may include historical driver data for the user that is predicted to travel the route from location A 304 to location B 314. In some examples, the data for the personal driver factors for road B 310 that the group device monitoring service identifies may correspond to a specific time, day of the week, or date that the group device monitoring service has predicted the user will be on road B 310. In other examples, the data for the personal driver factors for road B 310 that the group monitoring service identifies may correspond to any time, day of the week, or date the user drove road B 310.

The group device monitoring service may determine values for global driver factors for road B 310. The global driver data corresponding to those factors may be identified from global driver safety data store 320, which may include historical driver data for a plurality of drivers that have opted into data collection by the group device monitoring service. In some examples, the data for the global driver factors for road B 310 that the group device monitoring service identifies may correspond to a specific time, day of the week, or date that the group device monitoring service has predicted the user will be on road B 310. In other examples, the date for the global driver factors for road B 310 that the group monitoring service identifies may correspond to any times, days of the week, or dates the global users drove road B 310. In some examples, the global driver factors for road B 310 may be within a threshold temporal period (e.g., fifteen minutes, one hour) of the predicted time the user will be on road B 310.

The group device monitoring service may apply one or more operations and/or one or more functions to the determined values for personal driver factors for road B 310 and the determined values for global driver factors for road B 310, and thereby calculate score B 312A, which is a drive safety score for road B 310 (from location Y to location Z) at a specific time that the user is predicted to be on road B 310.

The group device monitoring service may then apply one or more operations and/or one or more functions to score A 308A/308B and score B 312A/312B, and thereby calculate drive safety score 322, which is a combined drive safety score from location A 304 to location B 314, including road A 306 (from location X to location Y) and road B 310 (from location Y to location Z). A determination as to whether to surface a drive safety notification may be made based on drive safety score 322, as more fully discussed in relation to FIG. 7. In other examples, a determination as to whether to surface a drive safety notification may be made based on the scores from individual road sections (e.g., score A 308A, score B 312A).

Figure 4:
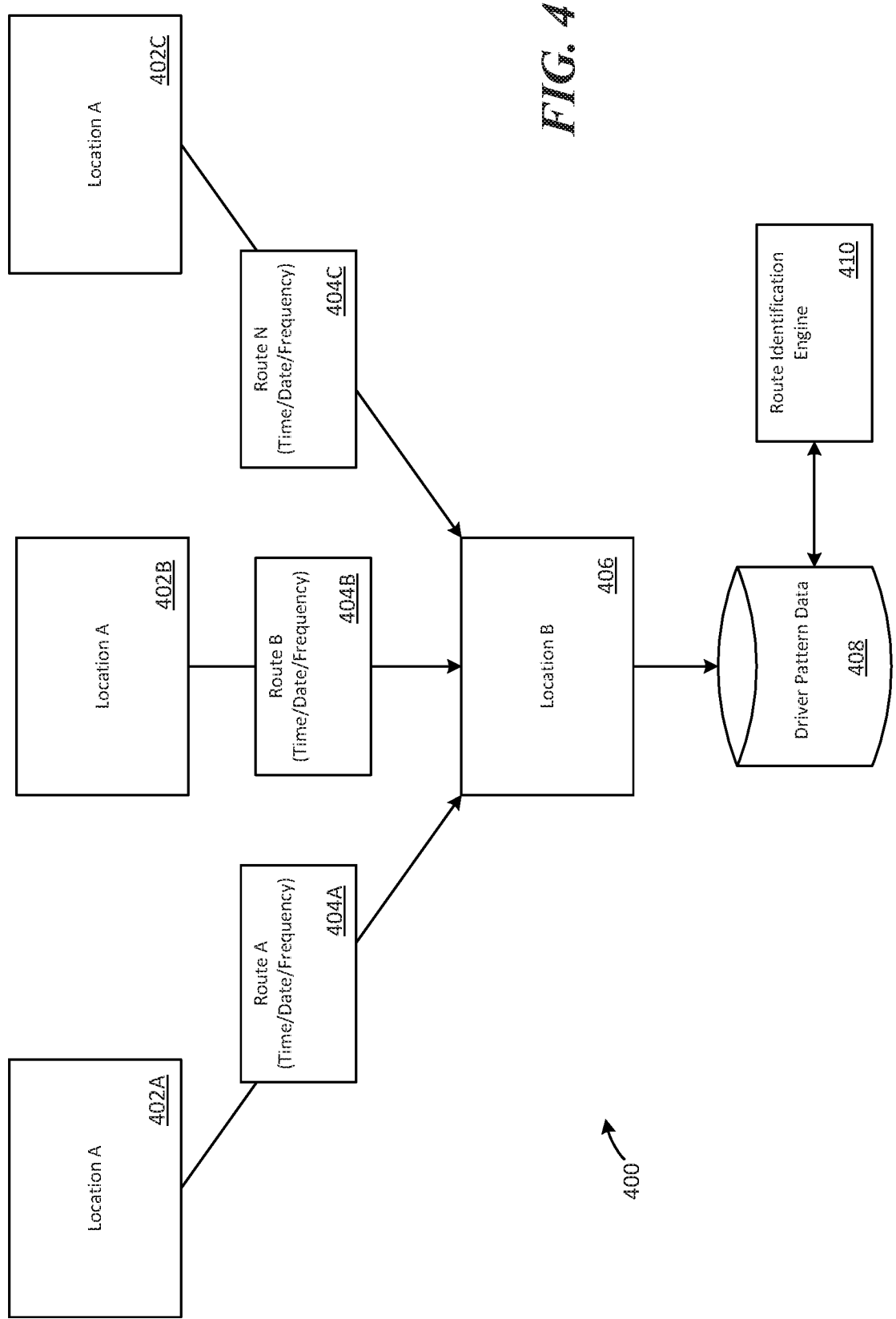
FIG. 4 illustrates a simplified block diagram for identifying and saving a new drive pattern for a user, and utilizing that data to identify future drives for the user.

FIG. 4 illustrates a simplified block diagram 400 for identifying and saving a new drive pattern for a user and utilizing that data to identify future drives for the user. Block diagram 400 includes location A 402A, location A 402B and location A 402C. Location A 402A, location A 402B and location A 402C correspond to the same geolocation. Location A is shown three times in block diagram 400 to illustrate a plurality of separate routes that a user has driven from that geolocation to location B 406. Block diagram 400 includes route A 404A, from location A 402A to location B 406; route B 404B, from location A 402B to location B 406; and route N from location A 402C to location B 406.

Route A 404A, route B 404B and route N 404C represent drive history data that may be collected by the group device monitoring service from one or more computing devices associated with a user account that the group device monitoring service monitors. In some examples, the user account may be a secondary user account. In other examples, the user account may be an administrator user account. The drive history data that may be collected for each of route A 404A, route B 404B, and route N 404C may include a time, day of the week, and/or date that the monitored user (e.g., the user's computing device) was determined to have left location A 402A/402B/402C, timestamps, geolocation stamps and and/or personal driver factors (e.g., speed factor, braking factor, acceleration factor, aggressive maneuvering/steering factor, and device use factor) while on the route from location A 402A/402B/402C to location B 408, and a time, day of the week, and/or date that the monitored user was determined to have arrived at location B 406. Some or all of this drive history data may be stored in driver pattern data store 408. In some examples, some or all of that data may additionally or alternatively be stored in a global driver data store.

The group device monitoring service may utilize the data associated with a user account in driver pattern data store 408 to make predictions regarding upcoming routes that a user may be taking. For example, if a user travels from a first location (e.g., location A 402A/402B/402C) to location B on a specific route (e.g., route A 404A, route B 404B, route C 404C) over a threshold number of times and/or with a threshold frequency at approximately (e.g., within five minutes, within fifteen minutes, within an hour) the same time, day of the week, and/or date, the group device monitoring service may tag those locations and routes as identified user patterns for the monitored user account. The identification and tagging of those routes may be performed by route identification engine 410.

Figure 5:
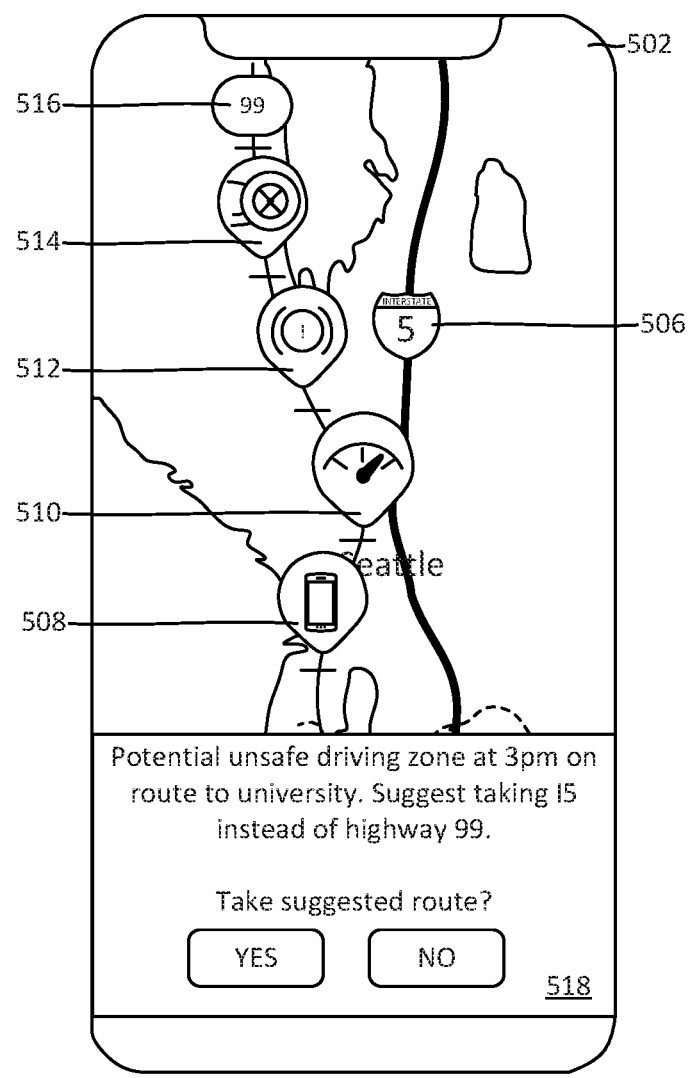
FIG. 5 illustrates the surfacing, on a computing device, of a drive safety notification in association with a potentially unsafe route, and the surfacing, on the computing device, of a recommendation to take an alternative route.

FIG. 5 illustrates the surfacing, on a computing device 502, of a drive safety notification 518 in association with a potentially unsafe route, and the surfacing, on the computing device 502, of a recommendation to take an alternative route.

Computing device 502 may be a computing device associated with a user account that is monitored by the group device monitoring service. In this example, the group device monitoring service has determined based on historical driver data that the user will likely be traveling on a specific route on Highway 99 516 to a university at 3 pm. The group device monitoring service has also determined, based on historical personal driver factors for the user, and global driver factors for the route and time, that the predicted route on Highway 99 at 3 pm has a drive safety score that is below a threshold value. However, the group device monitoring service has also determined that an alternate route on Interstate 5 506 to the university at 3 pm has a drive safety score that is above the threshold value. As such, the group device monitoring service causes drive safety notification 518 to be surfaced on computing device 518. Drive safety notification 518 states "Potential unsafe driving zone at 3 pm on route to university. Suggest taking IS instead of highway 99." Drive safety notification 518 is also surfaced in association with a selectable option to take the suggested route. Thus, if the "Yes" element is selected, a map application may automatically modify directions in the map application to take Interstate 5 at 3 pm to the university.

In addition to surfacing drive safety notification 518, the group device monitoring service also surfaces a plurality of icons corresponding to driver factors that correspond to reasons that the drive safety score for Highway 99 516 is below the threshold value. The driver factors are surfaced over the map of the route, while also showing the driver factors at the locations on the route where they are likely to occur based on analysis of historical driver data, which may be from the user account being monitored (e.g., personal driver factors) and/or from one or more other users (e.g. global driver factors). Specifically, device use factor element 508 is displayed at a first road section on the map, speed factor element 510 is displayed at a second road section on the map, braking factor 512 is displayed at a third road section on the map, and acceleration factor element 514 is displayed at a fourth road section on the map.

Figure 6:
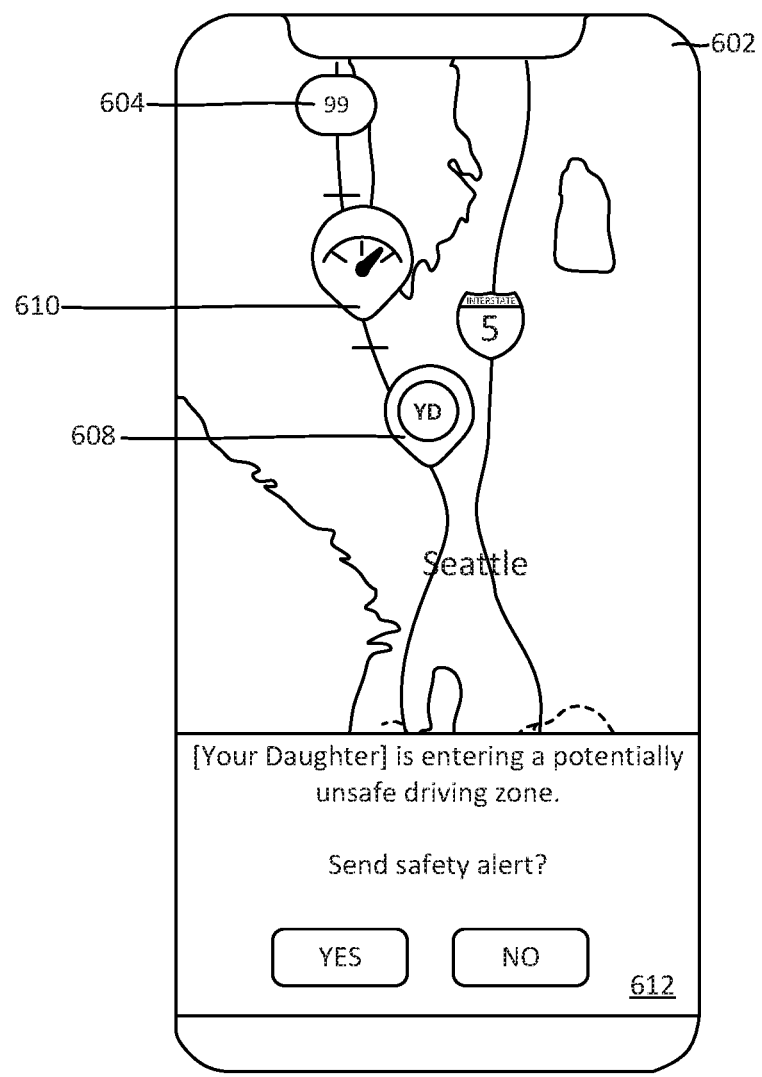
FIG. 6 illustrates the surfacing, on a computing device, of a drive safety notification in association with a potentially unsafe route, and the surfacing, on the computing device, of a selectable element to initiate safety alerts on a device of a secondary user account associated with the route.

FIG. 6 illustrates the surfacing, on a computing device 602, of a drive safety notification 612 in association with a potentially unsafe route, and the surfacing, on the computing device, of a selectable element to initiate safety alerts on a device of a secondary user account associated with the route. Computing device 502 may be a computing device associated with a user account that is monitored by the group device monitoring service. In some examples, computing device 502 may be associated with an administrator user account (e.g., a parent account), and that administrator user account may receive alerts and/or notifications related to one or more secondary user accounts (e.g., child user accounts) of a group monitored by the group device monitoring service.

In this example, the group device monitoring service has determined based on historical driver data that the secondary user "[Your Daughter]" will likely be traveling on a specific route on Highway 99 604 that has a drive safety score below a threshold value, or that the secondary user "[Your Daughter]" is currently on that route and will be entering a road section shortly that has a drive safety score below a threshold value. As such, the group device monitoring service causes drive safety notification 612 to be surfaced on computing device 602. Drive safety notification 612 states "[Your Daughter.]" is entering a potentially unsafe driving zone." The current location of the secondary user "[Your Daughter]" is indicated on the map displayed by computing device 602 at secondary user location element 608.

Drive safety notification 612 is also surfaced in association with a selectable element for sending safety alerts to one or more computing devices associated with the secondary user "[Your Daughter]". For example, upon selection of the "Yes" element in drive safety notification 612, a smart phone or other computing device associated with the secondary user may notify the secondary user that she is going to be entering a potentially unsafe driving area. The notification may include types of safety issues that are associated with that area. For example, drive safety notification 612 is surfaced with speed factor element 610, which is on a road section immediately in front of secondary user location element 608. As such, if the "Yes" element is selected on drive safety notification 612, the notification to the secondary user may include an indication that the upcoming road section on the route has a speeding issue associated with it that makes it unsafe. In additional examples, the notification provided to the secondary user may include a recommendation to slow down or otherwise be cautious driving. In some examples, the recommendation/notification may only be provided to the secondary user in an audible format (e.g., if the secondary user's smart phone is connected to the car's audio).

Figure 7:
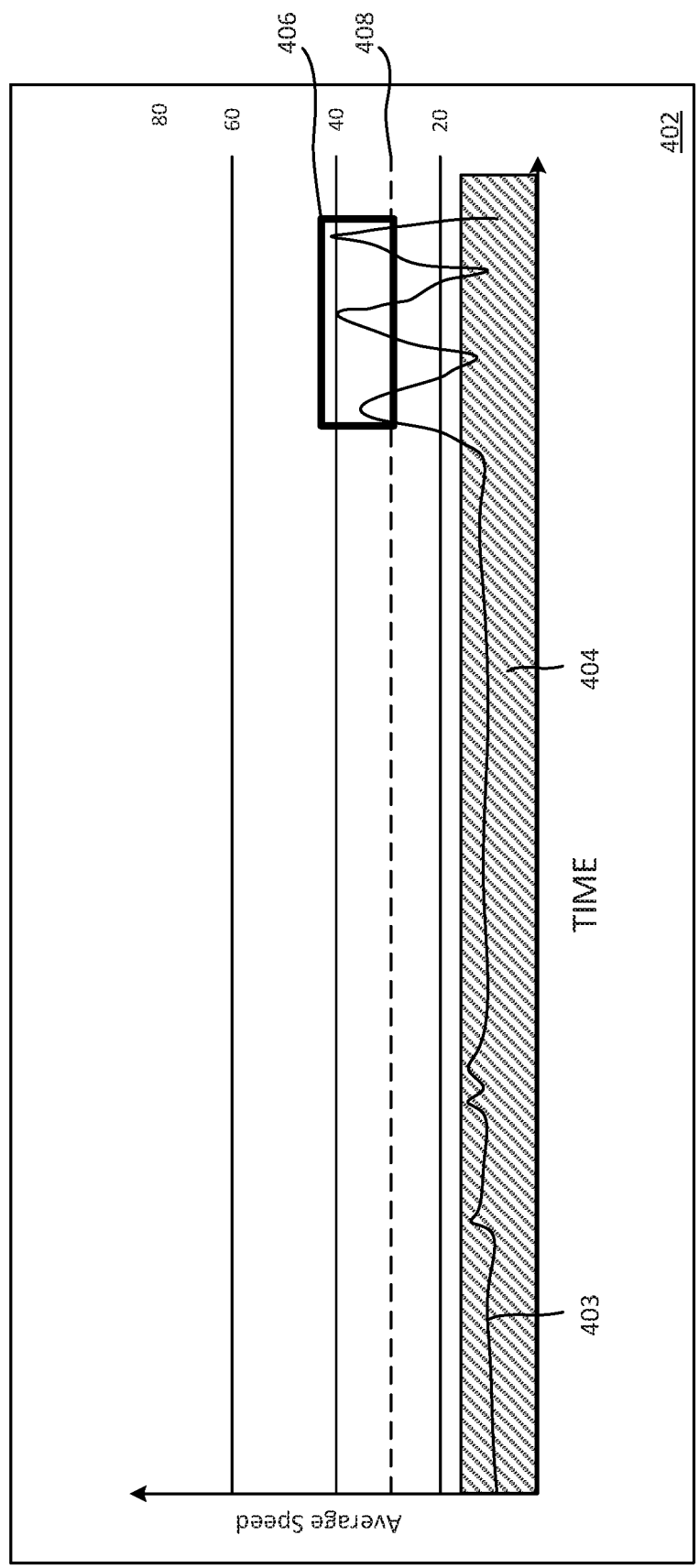
FIG. 7 depicts a graph that illustrates the application of a computing model for identifying potentially unsafe driving conditions and triggering drive safety notifications.

FIG. 7 depicts a graph 402 that illustrates the application of a computing model for identifying potentially unsafe driving conditions and triggering drive safety notifications. Graph 402 includes average speed on the Y axis and time on the X axis. Line 403 on graph 402 represents historical driver data. The historical driver data may relate to one driver or multiple drivers. The historical driver data corresponds to the driving of a road section of a route, and specifically, the speed of one or more drivers on the route. In some examples, line 403 may represent average speed. In other examples, line 403 may represent actual speed.

Graph 402 includes baseline 404, and threshold 408. Baseline 404 is a baseline value for speed, which users driving in the road section corresponding to the displayed data are generally within. For example, users in that road section may typically drive between one and 18 miles per hour. Threshold 408 corresponds to a value of speed over baseline 404 at which a drive safety notification may be sent to a user of the group monitoring service. For example, when line 403 crosses threshold 408 at section 406 of graph 402, a notification system may automatically send a drive safety notification to one or more users of the group device monitoring service to which the data represented by graph 402 corresponds to. For example, if graph 402 represents speed data for road section A in route A at 3 pm, and a determination is made that secondary user B is going to travel on road section A in route A at 3 pm, a drive safety notification may be sent to a device associated with secondary user B and/or an administrator user device associated with the secondary user's group. The notification may indicate that the route (or the specific road section corresponding to the road section represented by the data of graph 402) may be potentially unsafe at 3 pm due to speeding factors.

While graph 402 represents a computing model for identifying potentially unsafe driving conditions and triggering drive safety notifications in relation to speed, it should be understood that graphs that include baselines and thresholds for other driver factors may be utilized by the group device monitoring service. For example, acceleration factors, braking factors, and device usage factors may also be monitored by computing models implemented by the group device monitoring service, and notifications and/or alerts may be triggered based on those factors being determined to rise above a baseline value and over threshold value and/or fall below a baseline value and under a threshold value for those factors. In some examples, the baselines and/or thresholds may be configured via application of one or more machine learning models to global and/or specific driver data. In other examples, the baselines and/or thresholds may be configured manually.

Figure 8:
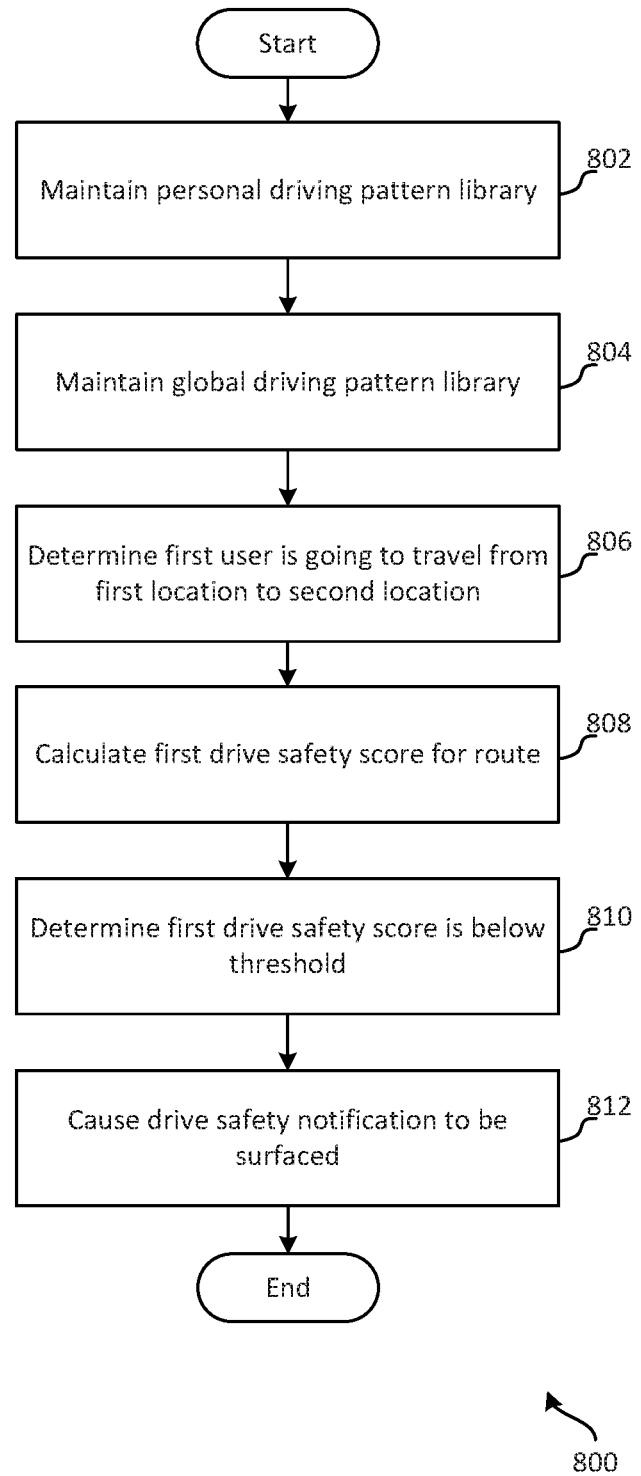
FIG. 8 is an exemplary method for surfacing drive safety notifications.

FIG. 8 is an exemplary method 800 for surfacing drive safety notifications. The method 800 begins at a start operation and flow moves to operation 802.

At operation 802 a personal driving pattern library comprising first data associated with a first user for a plurality of road sections included in a first route from a first location to a second location is maintained. The first user may be associated with a group account that is monitored by a group device monitoring service. The first user may have a first user account that is part of the group account. The first user account may be a secondary user account (e.g., a child account) or an administrator user account (e.g., a parent account). The first data may have been received from one or more mobile computing devices associated with the first user (e.g., smart phone associated with first user, smart watch associated with first user). The first data may include: historical speed data for the first user for the plurality of road sections included in the first route; historical braking data for the first user for the plurality of road sections included in the first route; historical steering data for the first user for the plurality of road sections included in the first route; historical computing device use for the first user while driving the plurality of road sections included in the first route; and/or historical acceleration data for the first user for the plurality of road sections included in the first route.

From operation 802 flow continues to operation 804 where a global driving pattern library comprising second data associated with a plurality of users for the plurality of road sections included in the first route is maintained. The second data may have been collected based on each of the plurality of users opting into a collection policy associated with the group device monitoring service. The second data may have been received from one or more mobile computing devices associated with the plurality of users (e.g., smart phones, smart watches, IoT devices in cars). The second data may include: historical speed data for the plurality of users for the plurality of road sections included in the first route; historical braking data for the plurality of users for the plurality of road sections included in the first route; historical steering data for the plurality of users for the plurality of road sections included in the first route; historical computing device use for the plurality of users while driving the plurality of road sections included in the first route; and/or historical acceleration data for the plurality of users for the plurality of road sections included in the first route.

From operation 804 flow continues to operation 806 where a determination is made that the first user is going to travel from the first location to the second location at a first time. The determination may be made based on a pattern of the first user traveling from the first location to the second location at the first time. For example, the determination may be made based on the first user traveling from the first location to the second location at approximately the first time (e.g., within five minutes, within fifteen minutes, within an hour) a threshold number of times (e.g., at least five times, at least ten times) or with a threshold frequency (e.g., twice a week, every Wednesday).

From operation 806 flow continues to operation 808 where a first drive safety score for the first user driving the first route at the first time is calculated from the first data and the second data. As described above, the first data and the second data may comprise historical driving data (e.g., speed data, braking data, acceleration data, steering data, device usage data). In some examples, the group device monitoring service may emphasize (e.g., weight) the first data more than the second data in calculating the first drive safety score. In other examples, the first data and the second data may be weighted evenly in calculating the first drive safety score. In still other examples the group device monitoring service may emphasize the second data more than the first data in calculating the first drive safety score.

From operation 808 flow continues to operation 810 where a determination is made that the first drive safety score is below a threshold value. The threshold value may be set manually and/or via application of one or more machine learning models to global driver data and/or specific driver data.

From operation 810 flow continues to operation 812 where a drive safety notification is caused to be surfaced. The drive safety notification may be caused to be surfaced on one or more computing devices associated with the group that the first user belongs to that is being monitored by the group device monitoring service. For example, if the first user is a secondary user of a group, the drive safety notification may be surfaced on an administrator user computing device of the group. In other examples, if the first user is a secondary user, the drive safety notification may be surfaced on a computing device associated with the secondary user. In some examples, the drive safety notification may include a recommendation to take a different route from the first location to the second location. In other examples, the drive safety notification may include a recommendation to leave from the first location to the second location at a different time. In additional examples, the drive safety notification may be surfaced with a selectable element for providing drive safe recommendations to the first user.

From operation 812 flow moves to an end operation and the method 800 ends.

Figure 9:
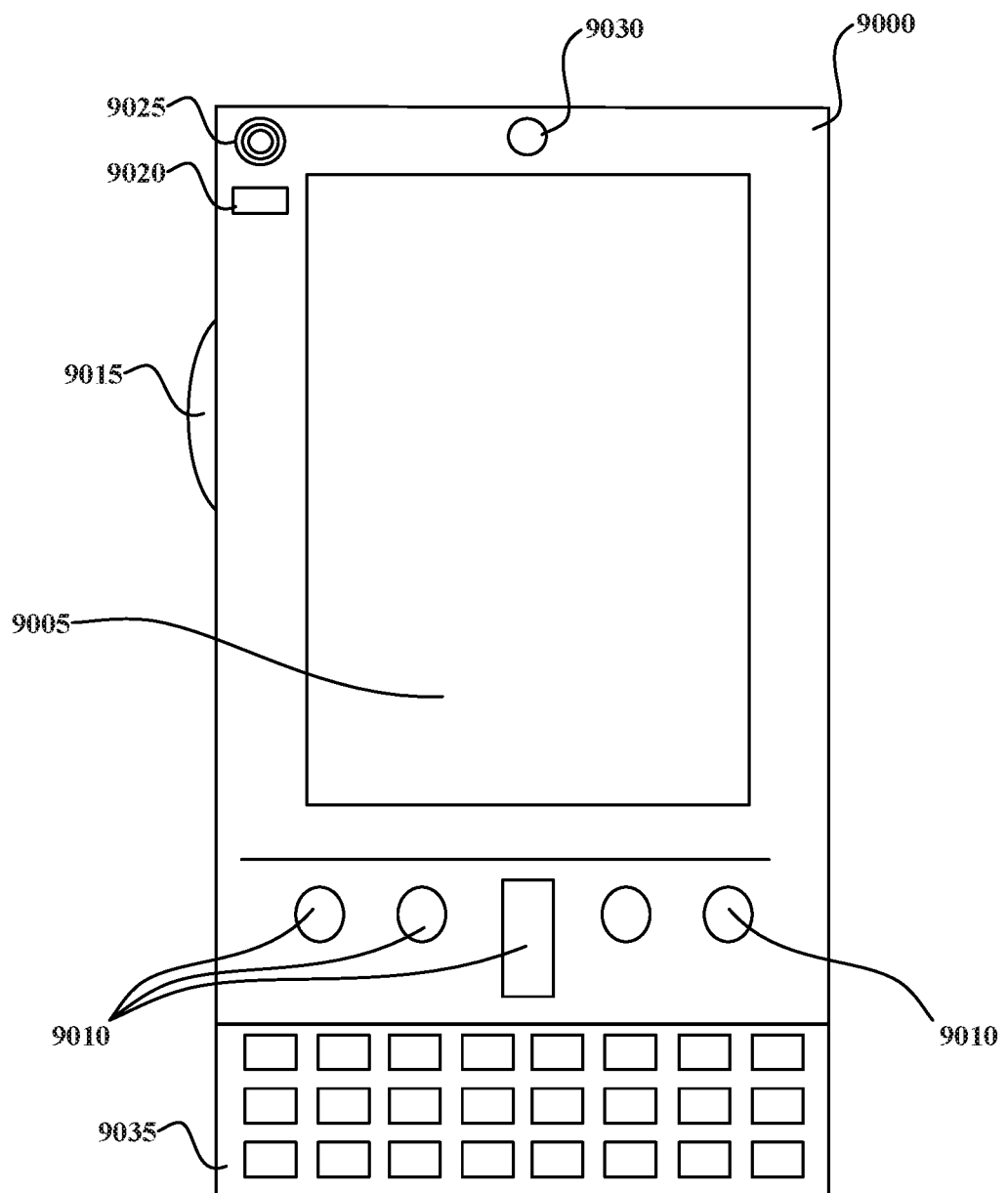
FIGS. 9 and 10 are simplified diagrams of a mobile computing device with which aspects of the disclosure may be practiced.
Figure 10:
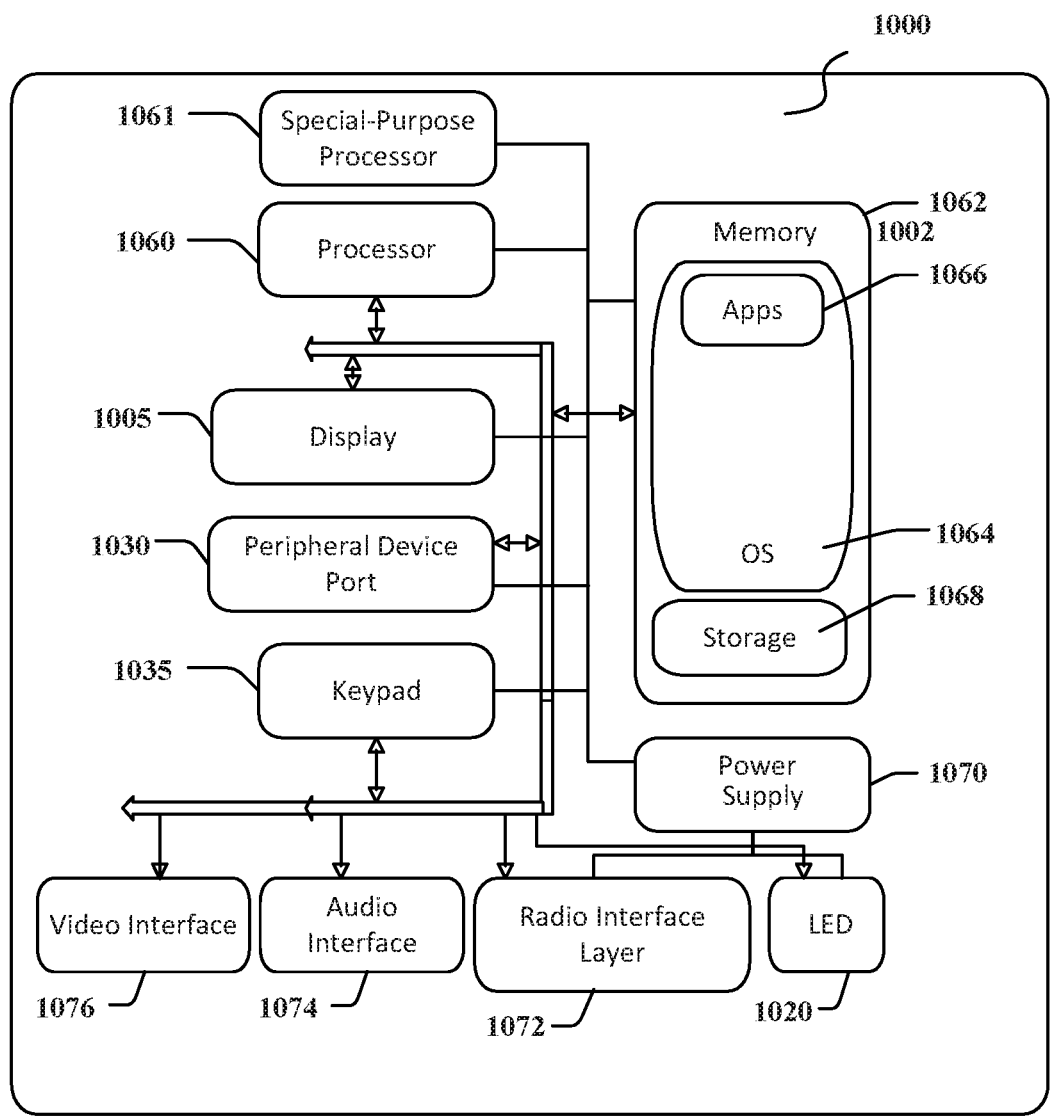

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a group device monitoring platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
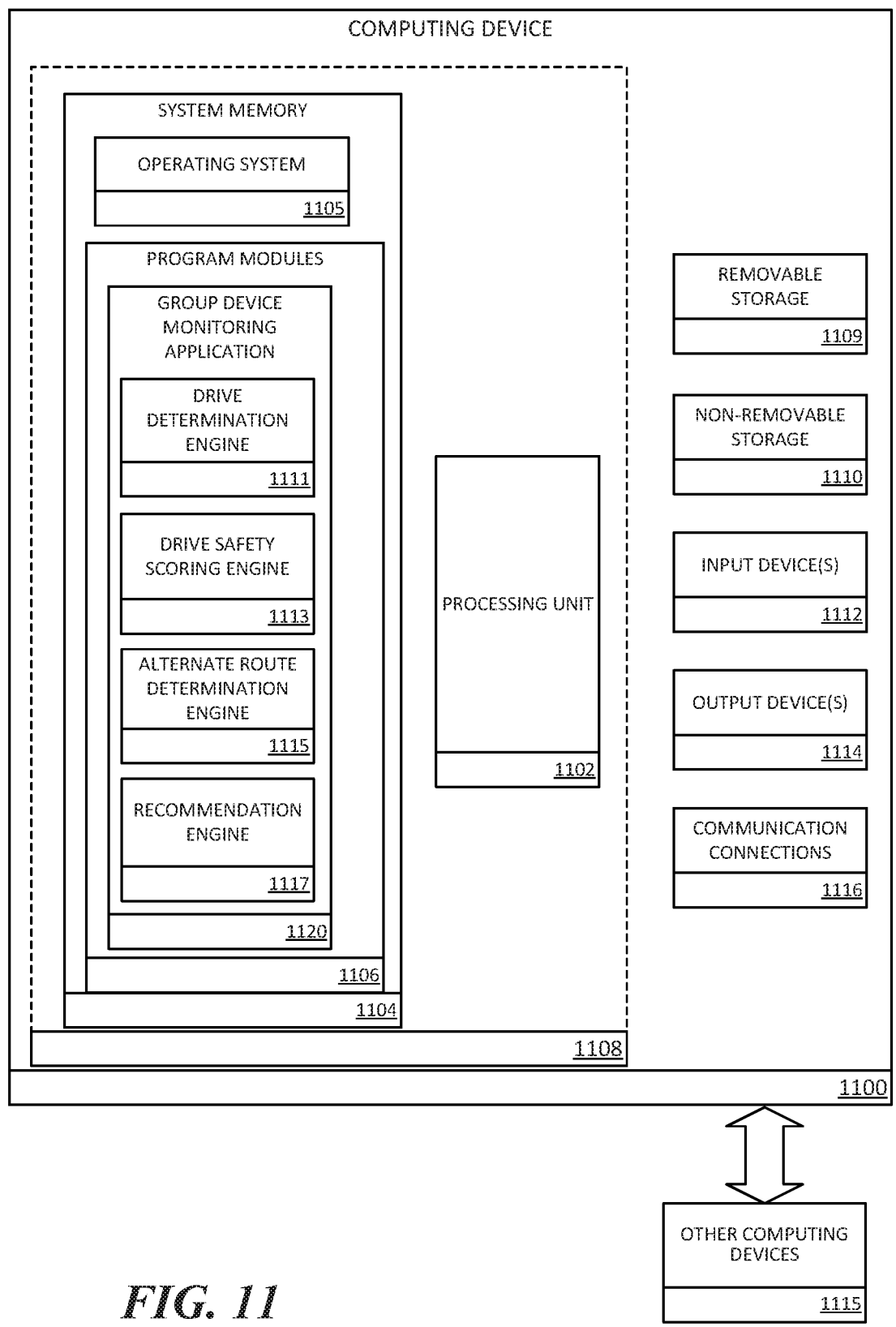
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for performing operations associated with a group device monitoring service as described herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more digital assistant programs. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., group device monitoring application 1120) may perform processes including, but not limited to, the aspects, as described herein. According to examples, drive determination engine 1111 may perform one or more operations associated with analyzing historical drive patterns for a user and predicting when a user is going to take a drive and/or drive a particular route. Drive safety scoring engine 1113 may perform one or more operations associated with analyzing one or more personal drive safety factors and/or one or more global driver drive safety factors and calculating a drive safety score for a route at a particular time and/or day. Alternate route determination engine 1115 may perform one or more operations associated with calculating a drive safety score for one or more alternative times and/or routes. Recommendation engine 1117 may perform one or more operations associated with surfacing recommendations that a user leave at an alternative time and/or take an alternate route based on a drive safety score for a primary route being below a threshold value and a drive safety score for a secondary route and/or secondary time being above a threshold value.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
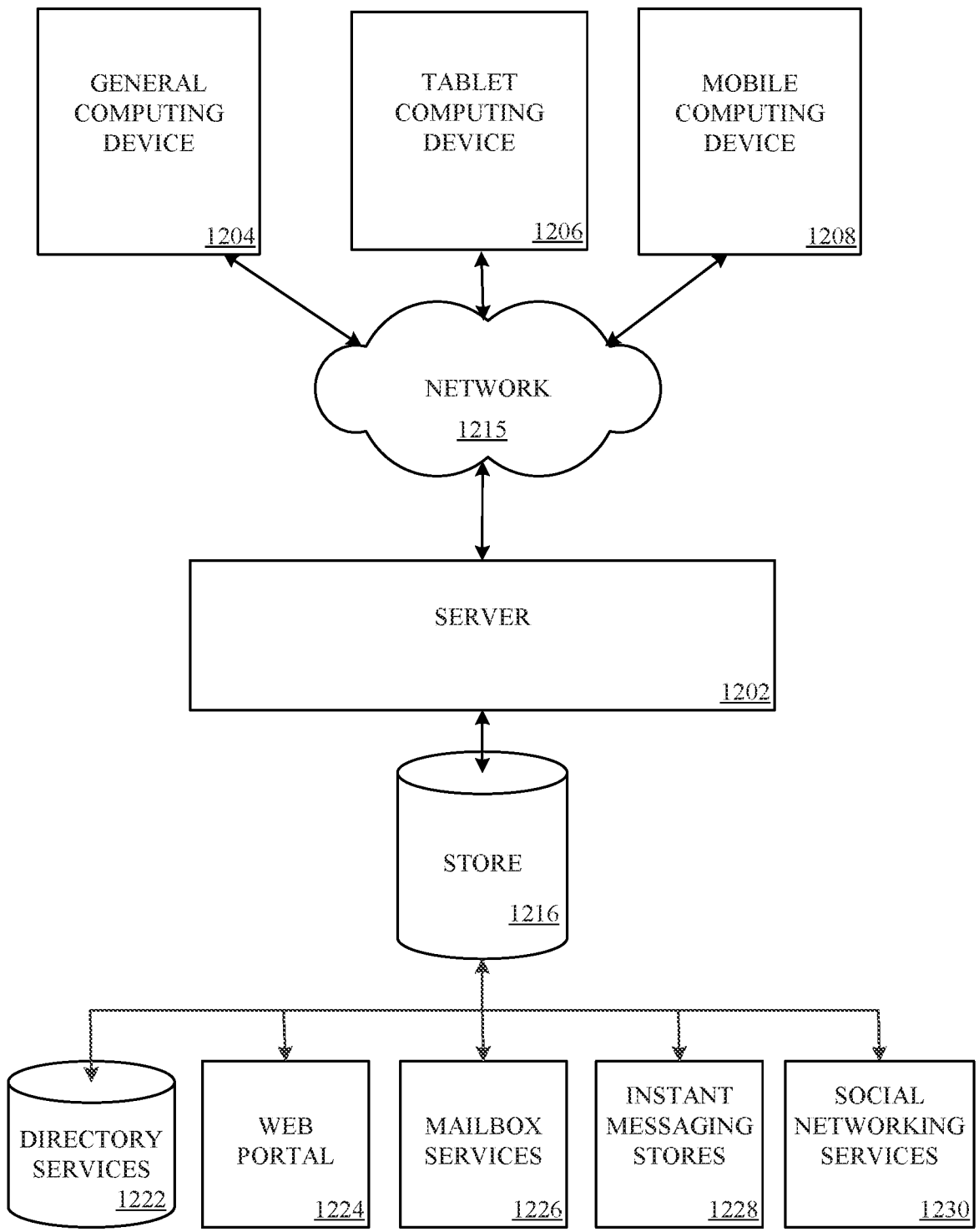
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for surfacing drive safety notifications, the computer-implemented method comprising:
   receiving driving data from a first user device of a first user associated with a secondary user account of a group managed by a group device monitoring application;
   maintaining:
      a personal driving pattern library comprising the driving data associated with the first user, the driving data comprising first data for a plurality of road sections included in a first route from a first location to a second location, and
      a global driving pattern library comprising second data associated with a plurality of users for the plurality of road sections included in the first route;
   determining, using a machine learning model, that the first user is going to travel the first route at a first time in the future based on at least one of the first data in the personal driving pattern library, data from one or more productivity application services associated with the first user, or a combination thereof;
   calculating, from the first data and the second data, a first drive safety score for the first user driving the first route at the first time;
   determining that the first drive safety score is below a threshold value; and
   transmitting a drive safety notification to a second user device of an administrator user associated with an administrator account of the group managed by the group device monitoring application, the drive safety notification comprising an indication that the first user travel of the first route at the first time in the future is potentially unsafe.

2. The computer-implemented method of claim 1, wherein determining that the first user is going to travel the first route at the first time comprises:
   determining, using the machine learning model based on the data in the personal driving pattern library, that the first user has traveled the first route at the first time a threshold number of times.

3. The computer-implemented method of claim 1, wherein:
   the global driving pattern library further comprises third data associated with the plurality of users for a second plurality of road sections included in a second route from the first location to the second location.

4. The computer-implemented method of claim 3, wherein:
   the personal driving pattern library further comprises fourth data associated with the first user for a second plurality of road sections included in the second route from the first location to the second location.

5. The computer-implemented method of claim 4, further comprising:
   calculating, from at least one of: the third data, and the fourth data, a second drive safety score for the first user driving the second route at the first time;
   determining that the second drive safety score is above a threshold value; and
   transmitting a recommendation to drive the second route instead of the first route with the drive safety notification to the first user device.

6. The computer-implemented method of claim 1, wherein determining that the first user is going to travel the first route at the first time comprises:
   determining, using the machine learning model based on data from the one or more productivity application services associated with the first user, that the first user is going to travel the first route at the first time.

7. The computer-implemented method of claim 1, wherein:
   the first data includes first temporal data for the plurality of road sections included in the first route, the first temporal data corresponding to the first time;
   the first data includes second temporal data for the plurality of road sections included in the first route, the second temporal data corresponding to a second time;
   the second data includes third temporal data for the plurality of road sections included in the first route, the third temporal data corresponding to the first time; and
   the second data includes fourth temporal data for the plurality of road sections included in the first route, the fourth temporal data corresponding to the second time.

8. The computer-implemented method of claim 7, further comprising:
   calculating, from the second temporal data and the fourth temporal data, a second drive safety score for the first user driving the first route at the second time;
   determining that the second drive safety score is above a threshold value; and
   transmitting a recommendation to drive the first route at the second time instead of the first time with the drive safety notification to the first user device.

9. The computer-implemented method of claim 1, wherein the drive safety notification further comprises a ratio of the road sections in the first route that have unsafe characteristics.

10. The computer-implemented method of claim 1, wherein calculating the first drive safety score for the first user driving the first route at the first time further comprises:
    calculating, from the first data, a first personal section safety score for driving a first one of the plurality of road sections at the first time;
    calculating, from the first data, a second personal section safety score for driving a second one of the plurality of road sections at the first time;
    calculating, from the second data, a first global section safety score for driving the first one of the plurality of road sections at the first time; and
    calculating, from the second data, a second global section safety score for driving the second one of the plurality of road sections at the first time.

11. The computer-implemented method of claim 10, further comprising:
    determining that at least one of the second personal section safety score and the second global section safety score is below road section threshold score; and
    transmitting an indication that the second one of the plurality of road sections has a low safety score for the first time associated with it with the drive safety notification to the first user device.

12. The computer-implemented method of claim 1:
wherein the first data associated with the first user comprises:
historical speed data for the first user for the plurality of road sections included in the first route;
historical braking data for the first user for the plurality of road sections included in the first route
historical computing device use for the first user while driving the plurality of road sections included in the first route; and
historical acceleration data for the first user for the plurality of road sections included in the first route; and
wherein the second data associated with the plurality of users comprises:
historical speed data for the plurality of users for the plurality of road sections included in the first route;
historical braking data for the plurality of users for the plurality of road sections included in the first route;
historical computing device use for the plurality of users while driving the plurality of road sections included in the first route; and
historical acceleration data for the plurality of users for the plurality of road sections included in the first route.

13. The computer-implemented method of claim 12, wherein calculating the first drive safety score for the first user driving the first route at the first time comprises:
calculating a combined speed safety score for each of the plurality of road sections;
calculating a combined braking safety score for each of the plurality of road sections;
calculating a combined device use safety score for each of the plurality of road sections; and
calculating a combined acceleration safety score for each of the plurality of road sections.

14. The computer-implemented method of claim 13, further comprising:
determining that the combined speed safety score for at least one of the plurality of road sections is below a combined speed safety threshold value; and
transmitting an indication that the first route has a speed issue associated with it with the drive safety notification to the first user device.

15. The computer-implemented method of claim 13, further comprising:
determining that the combined device use safety score for at least one of the plurality of road sections is below a combined device use safety threshold value; and
transmitting an indication that the first route has a device use issue associated with it with the drive safety notification to the first user device.

16. A system for surfacing drive safety notifications, comprising:
a memory for storing executable program code; and
a processor, functionally coupled to the memory, the processor being responsive to computer-executable instructions contained in the program code and operative to:
receive driving data from a first user device of a first user associated with a secondary user account of a group managed by a group device monitoring application;
maintain a personal driving pattern library comprising the driving data associated with the first user, the driving data comprising first data for a plurality of road sections included in a first route from a first location to a second location;
maintain a global driving pattern library comprising second data associated with a plurality of users from the plurality of road sections included in the first route;
determine, using a machine learning model, that the first user is going to travel the first route at a first time in the future based on at least one of the first data in the personal driving pattern library, data from one or more productivity application services associated with the first user, or a combination thereof;
calculate, from the first data and the second data, a first drive safety score for the first user driving the first route at the first time;
determine that the first drive safety score is below a threshold value; and
transmit a drive safety notification to a second user device of an administrator user associated with an administrator account of the group managed by the group device monitoring application, the drive safety notification comprising an indication that the first user travel of the first route at the first time in the future is potentially unsafe.

17. The system of claim 16, wherein:
the global driving pattern library further comprises third data associated with the plurality of users for a second plurality of road sections included in a second route from the first location to the second location;
the personal driving pattern library further comprises fourth data associated with the first user for the second plurality of road sections included in the second route from the first location to the second location;
and wherein, the processor is further responsive to the computer-executable instructions contained in the program code and operative to:
calculate, from at least one of: the third data, and the fourth data, a second drive safety score for the first user driving the second route at the first time;
determine that the second drive safety score is above a threshold value; and
transmit a recommendation to drive the second route instead of the first route with the drive safety notification to the first user device.

18. The system of claim 17, wherein the processor is further responsive to the computer-executable instructions contained in the program code and operative to:
identify external characteristics of the first route at the first time that are unusual for the first route, wherein calculating the first drive safety score is further based on the external characteristics.

19. A computer-readable storage device comprising executable instructions that, when executed by a processor, assist with surfacing drive safety notifications, the computer-readable storage device including instructions executable by the processor for:
receiving driving data from a first user device of a first user associated with a secondary user account of a group managed by a group device monitoring application;
maintaining a personal driving pattern library comprising the driving data associated with the first user, the driving data comprising first data for a plurality of road sections included in a first route from a first location to a second location;

maintaining a global driving pattern library comprising second data associated with a plurality of users from the plurality of road sections included in the first route;

determining, using a machine learning model, that the first user is going to travel the first route at a first time in the future based on at least one of the first data in the personal driving pattern library, data from one or more productivity application services associated with the first user, or a combination thereof;

calculating, from the first data and the second data, a first drive safety score for the first user driving the first route at the first time;

determining that the first drive safety score is below a threshold value; and transmitting a drive safety notification to a second user device of an administrator user associated with an administrator account of the group managed by the group device monitoring application, the drive safety notification comprising an indication that the first user travel of the first route at the first time in the future is potentially unsafe.

20. The computer-readable storage device of claim 19, wherein:

the global driving pattern library further comprises third data associated with the plurality of users for a second plurality of road sections included in a second route from the first location to the second location;

the personal driving pattern library further comprises fourth data associated with the first user for the second plurality of road sections included in the second route from the first location to the second location;

and wherein, the instructions are further executable by the processor for:

calculating, from at least one of: the third data, and the fourth data, a second drive safety score for the first user driving the second route at the first time;

determining that the second drive safety score is above a threshold value; and transmitting a recommendation to drive the second route instead of the first route with the drive safety notification to the first user device.

* * * * *